US008316073B1

(12) United States Patent
Stevens

(10) Patent No.: US 8,316,073 B1
(45) Date of Patent: Nov. 20, 2012

(54) OPTICAL PROCESSOR

(75) Inventor: Rick C. Stevens, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 646 days.

(21) Appl. No.: 12/571,723

(22) Filed: Oct. 1, 2009

(51) Int. Cl.
*G06F 15/00* (2006.01)

(52) U.S. Cl. ........ 708/816; 708/404; 708/817; 708/818; 708/835

(58) Field of Classification Search .................. 708/404, 708/816–818, 835
See application file for complete search history.

(56) References Cited

U.S. PATENT DOCUMENTS

| | | | | |
|---|---|---|---|---|
| 5,951,627 | A * | 9/1999 | Kiamilev et al. | 708/404 |
| 6,873,560 | B2 * | 3/2005 | Pavlichek | 365/215 |
| 7,734,174 | B2 * | 6/2010 | Beckett et al. | 398/32 |
| 2002/0034354 | A1 * | 3/2002 | Hayashi et al. | 385/17 |

OTHER PUBLICATIONS

Optical addition architecture.
Optical multiply architecture.
Optical multiply and add architecture.
U.S. Appl. No. 12/481,223, filed Jun. 9, 2009.
U.S. Appl. No. 12/607,448, filed Oct. 28, 2009.
U.S. Appl. No. 12/607,469, filed Oct. 28, 2009.

* cited by examiner

*Primary Examiner* — Tammara Peyton
(74) *Attorney, Agent, or Firm* — Hamre, Schumann, Mueller and Larson, P.C.

(57) ABSTRACT

An optical processor that incorporates optical computing in a monolithic, i.e. single unit, structure that can take the place of, or operate as a coprocessor with, traditional processor devices such as vector processors, digital signal processors, RISCs, CISCs, ASICs, FPGAs among others. The optical processor incorporates photonic devices that perform algorithmic functions on optical signals. The optical processor takes one or more incoming digital signals, converts the digital signal into an optical signal, performs the algorithmic function(s) in the optical domain, and then converts the result back into a digital signal, all in a monolithic or single unit structure.

9 Claims, 2 Drawing Sheets

OPTICAL PROCESSOR

FIELD

This disclosure relates to photonics and optical computing.

BACKGROUND

Many computing demands are pushing the limits of what can be accomplished using traditional semiconductor-based processor devices, for example reduced instruction set computers (RISC), complex instruction set computers (CISC), application specific integrated circuits (ASIC), and field programmable gate arrays (FPGA). Traditional semiconductor-based processor devices are also limited by size, power, and heat constraints.

SUMMARY

An optical processor is described that incorporates optical computing in a monolithic, i.e. single unit, structure that can take the place of, or operate together with as a coprocessor, traditional processor devices such as vector processors, digital signal processors, RISCs, CISCs, ASICs, FPGAs among others.

The optical processor incorporates photonic devices that perform algorithmic functions on optical signals. The optical processor takes one or more incoming digital signals, converts it into an optical signal, performs the algorithmic function(s) in the optical domain, and then converts the result back into a digital signal, all in a monolithic or single unit structure.

In one example, the optical processor is a monolithic structure that includes an input register that is configured to receive a digital input signal, a digital to analog converter is connected to the input register that is configured to convert a digital input signal received by the input register into an analog electrical signal, and an optical transmitter is connected to the digital to analog converter that is configured to convert an analog electrical signal from the digital to analog converter into an optical signal. Algorithmic function circuitry is connected to the optical transmitter that is configured to perform an algorithmic function using an optical signal received from the optical transmitter and that outputs a result in the form of an optical signal. In addition, an optical receiver is connected to the algorithmic function circuitry that is configured to convert the optical signal of the result received from the algorithmic function circuitry into an analog electrical signal, an analog to digital converter is connected to the optical receiver that is configured to convert the analog electrical signal received from the optical receiver into a digital output signal, and an output register is connected to the analog to digital converter that is configured to receive the digital output signal.

In another example, a processing system is described that includes a main processor, and a plurality of coprocessors connected to the main processor. At least one of the coprocessors is the optical processor having optical algorithmic function circuitry.

DRAWINGS

DETAILED DESCRIPTION

Figure 1:
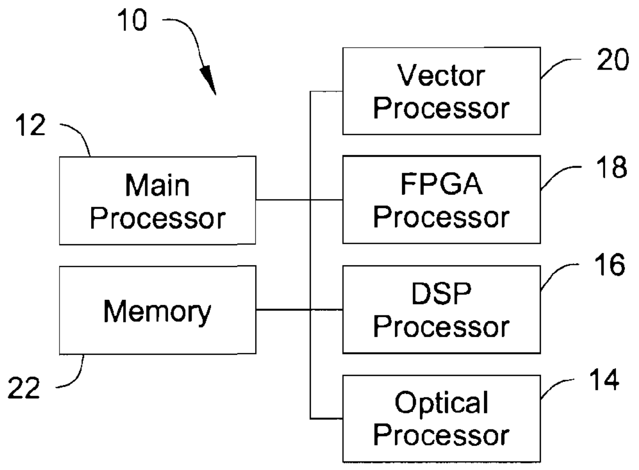
FIG. 1 illustrates a processing system that incorporates the optical processor as a coprocessor.

With reference to FIG. 1, a processing system 10 is illustrated that includes a main processor 12 and a plurality of coprocessors in communication with the main processor 12 for supporting the main processor. In the illustrated example the coprocessors include an optical processor 14, a digital signal processor (DSP) 16, a FPGA processor 18 and a vector processor 20. Other numbers and types of coprocessors used in conventional computing devices can be utilized, but at least one coprocessor is the unique optical processor 14 described herein. It is to be understood that the optical processor 14 could be the only coprocessor connected to the main processor 12, and multiple optical processors 14 could be provided. The coprocessors help support the primary program flow from the main processor 12. The coprocessors 14-20 can also be connected to each other to help support the other coprocessors. Further, the optical processor 14 could function as a main processor, not connected to the main processor 12 or to other coprocessors.

The illustrated system 10 also includes memory 22 that is shared by the main processor and the coprocessors. The system 10 can be designed to perform any number of intended tasks including, but not limited to, general purpose computing. The construction and operation of the main processor 12, coprocessors 16, 18, 20 and memory 22 are conventional and well understood by persons of ordinary skill in the art.

The optical processor 14 is a monolithic, i.e. single unit, structure that receives and outputs signals in the digital domain, but also incorporates photonic circuitry to perform an algorithmic function in the optical domain. The various circuitry of the optical processor 14 could be disposed on a single substrate or disposed on multiple substrates that function together as a single unit, each of which is to be considered as a monolithic structure as long as the described functions of the optical processor 14 are performed by that structure.

Figure 2:
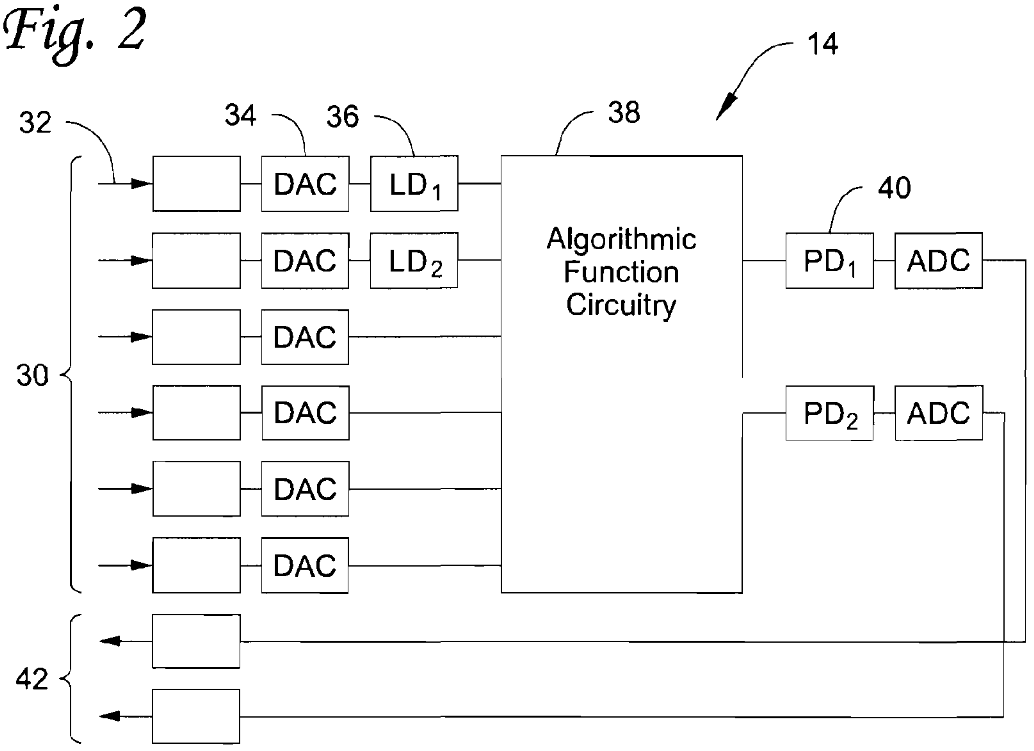
FIG. 2 illustrates an example of the circuitry on the optical processor.

An example of the optical processor 14 is illustrated in FIG. 2. The optical processor 14 includes at least one input register 30. Preferably, a plurality of input registers 30 are provided, each of which is configured to receive a digital input signal 32. A digital to analog converter (DAC) 34 is connected to each input register 30. The DAC's are configured to convert a digital input signal received by its associated input register 30 into an analog electrical signal.

At least one optical transmitter 36 is connected to one of the DACs 34. In the example illustrated in FIG. 2, two optical transmitters 36 are provided, each one being connected to a respective one of the DACs. The optical transmitter 36 is configured to convert the analog electrical signal from the DAC 34 into an optical signal. Any device that can convert an analog electrical signal into an optical signal can be used as the optical transmitter 36. An example of a suitable optical transmitter 36 includes, but is not limited to, a laser diode.

Algorithmic function circuitry 38 is provided that is configured to execute one or more algorithmic functions in the optical domain. The circuitry 38 is connected to the optical transmitter(s) 36 to receive the optical signal(s) therefrom. The circuitry 38 can also be directly connected to one or more of the DACs to receive an analog electrical signal(s) from the DAC(s). The inputs to the circuitry 38 are dictated by the algorithmic function(s) the circuitry is designed to perform. However, at least one input must be an optical signal from an optical transmitter 36. Examples of algorithmic functions that the circuitry 38 can be configured to execute includes, but is not limited to, vector matrix multiply (VMM), fast fourier transform (FFT), correlators, and multiply and accumulates (MACs).

The circuitry 38 outputs a result in the form of one or more optical signals that are input into an optical receiver(s) 40. In the example illustrated in FIG. 2, two optical receivers 40 are provided, each one being connected to the circuitry 38 and receiving an optical signal. The optical receiver 40 is configured to convert the optical signal into an analog electrical signal. Any device that can convert an optical signal into an analog electrical signal can be used as the optical receiver 40. An example of a suitable optical receiver 40 includes, but is not limited to, a photo diode.

The analog electrical signal from each optical receiver 40 is then input into an analog to digital converter (ADC) that converts the analog electrical signal into a digital output signal. The output signals are then directed to an output register 42. Preferably, a plurality of output registers 42 are provided, each of which is configured to receive an output signal. The output registers 42 direct the output signals to the main processor 12, one of the other coprocessors 16, 18, 20 and/or to the memory 22.

Figure 3:
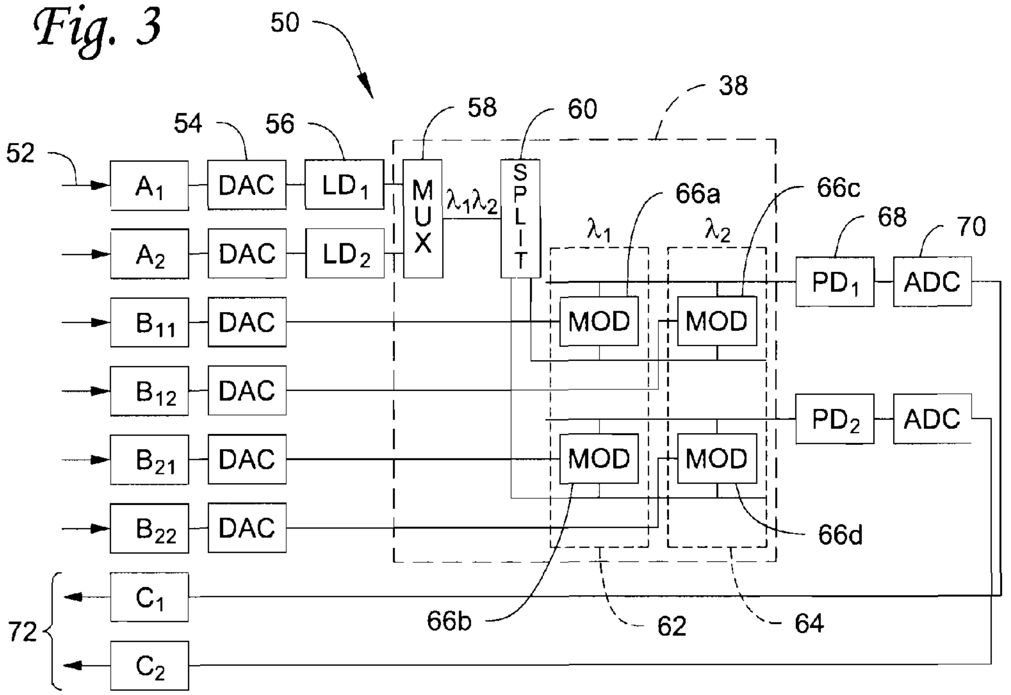
FIG. 3 illustrates an example of the optical processor incorporating algorithmic function circuitry using wavelength-division multiplexing (WDM).

With reference to FIG. 3, an example of an optical processor 50 is illustrated where the algorithmic function circuitry 38, shown in dashed lines, is configured for a VMM function employing WDM. It is to be realized that the optical processor and the algorithmic function circuitry therein can vary from the example described and illustrated in FIG. 3.

The processor 50 includes input registers 52 labeled $A_1$, $A_2$, $B_{11}$, $B_{12}$, $B_{21}$ and $B_{22}$, DACs 54 connected to each of the input registers, and optical transmitters 56 in the form of laser diodes $LD_1$ and $LD_2$, which transmit light at two different optical wavelengths, connected to the DACs associated with registers $A_1$ and $A_2$.

The algorithmic function circuitry 38 is configured to perform a VMM function to resolve the following specific function:

$$[A_1 A_2] \times \begin{bmatrix} B_{11} & B_{12} \\ B_{21} & B_{22} \end{bmatrix} = \begin{bmatrix} C_1 = A_1 * B_{11} + A_2 * B_{12} \\ C_2 = A_1 * B_{21} + A_2 * B_{22} \end{bmatrix}$$

To accomplish the VMM function, the function circuitry 38 includes a multiplexer 58 that receives the optical signals, $\lambda_1$ and $\lambda_2$, from the optical transmitters 56 and combines the signals into a single optical signal $\lambda_1$, $\lambda_2$. Note that $\lambda_1$ and $\lambda_2$ correspond to the signals input through the registers $\lambda_1$ and $\lambda_2$, respectively. The combined optical signal $\lambda_1$, $\lambda_2$ is input into a splitter 60 which splits the combined signal into two portions.

The function circuitry 38 also includes a pair of modulator sections 62, 64, each modulator section including a pair of optical (i.e. electro-optic) modulators 66*a*, 66*b*, 66*c*, 66*d*. The optical modulators 66*a*, 66*b* of section 62 are tuned to the optical wavelength or frequency of signal $\lambda_1$, while the modulators 66*c*, 66*d* of section 64 are tuned to the optical wavelength or frequency of signal $\lambda_2$.

One portion of the signal from the splitter 60 is input to the modulators 66*a*, 66*c* of the sections 62, 64, while the other portion of the signal from the splitter is input to the modulators 66*b*, 66*d* of the sections 62, 64. Since the modulators 66*a*, 66*b* are tuned to the signal $\lambda_1$, they only act on that portion of the multiplexed signal, while the modulators 66*c*, 66*d* only act on the portion of the signal $\lambda_2$. In addition, the analog electrical signal from the DAC associated with input register $B_{11}$ is input to the modulator 66*a* of the section 62, the analog electrical signal from the DAC associated with input register $B_{12}$ is input to the modulator 66*c* of the section 64, the analog electrical signal from the DAC associated with input register $B_{21}$ is input to the modulator 66*b* of section 62, and the analog electrical signal from the DAC associated with input register $B_{22}$ is input to the modulator 66*d* of section 64.

The modulators 66*a-d* perform the multiplication functions of $A_1 \times B_{11}$, $A_2 \times B_{12}$, $A_1 \times B_{21}$ and $A_2 \times B_{22}$. Optical modulators or Variable Optical Attenuators (VOAs) are known optical functions that can be implemented using a variety of different technologies and are used to attenuate an optical signal proportional to the value of an electrical input. In the illustrated example, the outputs of the DACs associated with $B_{11}$, $B_{12}$, $B_{21}$, and $B_{22}$ are used to modulate the outputs from $LD_1$ and $LD_2$ to effectively perform a multiplication function. The optical outputs of the modulators 66*a*, 66*c* are added together to result in an optical amplitude value that is equal to $C_1$, while the optical outputs of the modulators 66*b*, 66*d* are added together to result in an optical amplitude value that is equal to $C_2$. The optical values $C_1$ and $C_2$ are input into optical receivers 68 in the form of photo diodes which convert the optical signals into analog electrical signals and then converted by ADCs 70 to digital signals and output via output registers 72 labeled $C_1$ and $C_2$.

Figure 4:
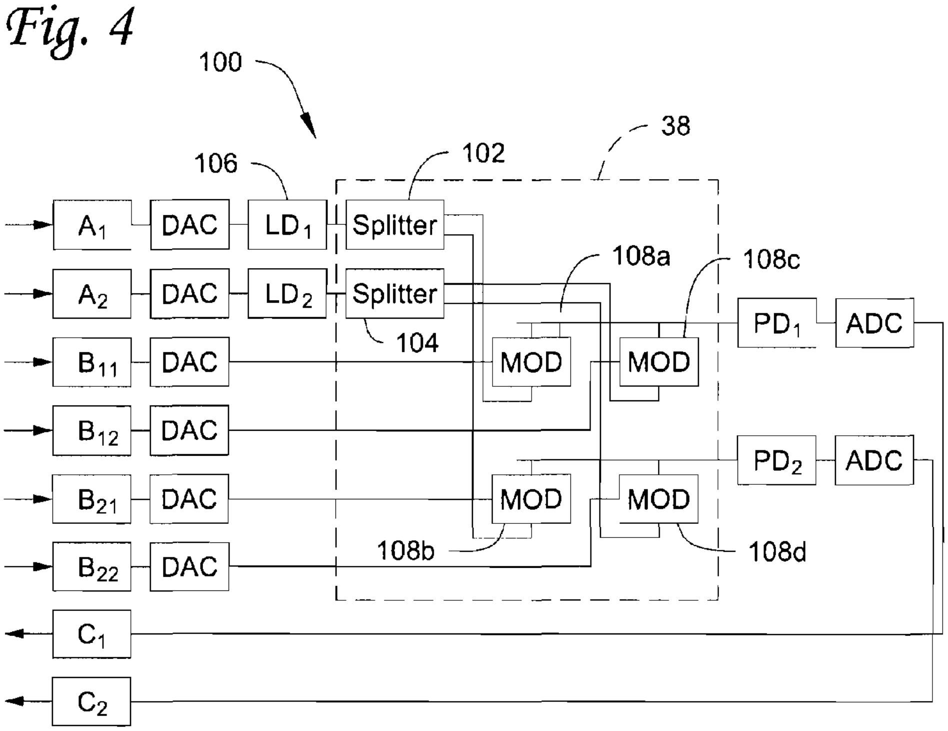
FIG. 4 illustrates an example of the optical processor incorporating algorithmic function circuitry using non-WDM optics.

FIG. 4 illustrates an optical processor 100 that is similar in construction and function to the optical processor 50 including the algorithmic function circuitry 38 being configured to perform the same VMM function described above with respect to FIG. 3. However, the algorithmic function circuitry 38 of FIG. 4 does not use WDM optics. Instead, the algorithmic function circuitry 38 includes a pair of optical splitters 102, 104 connected to optical transmitters 106. The outputs of the splitter 102 are input to optical modulators 108*a*, 108*b*, while the outputs of the splitter 104 are input to optical modulators 108*c*, 108*d*, where the modulators 108*a-d* perform the same the multiplication functions discussed above for FIG. 3.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An optical processor, comprising a monolithic structure that includes:

a plurality of input registers each of which is configured to receive a digital input signal;

a plurality of digital to analog converters, each one connected to a respective one of the input registers, each digital to analog converter is configured to convert a digital input signal received by the respective input register into an analog electrical signal;

at least two optical transmitters, each one connected to respective one of the digital to analog converters and that are configured to convert an analog electrical signal from the respective digital to analog converter into an optical signal;

algorithmic function circuitry connected to the optical transmitters that is configured to perform an algorithmic function using an optical signal received from the optical transmitters and that outputs results in the form of optical signals;

at least two optical receivers connected to the algorithmic function circuitry to receive a respective one of the optical signal results, each optical receiver is configured to convert the optical signal of the result received from the algorithmic function circuitry into an analog electrical signal;

a plurality of analog to digital converters, each connected to a respective one of the optical receivers and that is configured to convert the respective analog electrical signal received from the respective optical receiver into a digital output signal; and a plurality of output registers, each connected to a respective one of the analog to digital converters that is configured to receive the digital output signals.

2. The optical processor of claim 1, wherein the optical transmitters comprise laser diodes.

3. The optical processor of claim 1, wherein the optical receivers comprise photodiodes receiver comprises a photodiode.

4. The optical processor of claim 1, wherein the algorithmic function circuitry is configured to perform a multiply function and/or an add function.

5. A processing system, comprising:

a main processor; and a plurality of coprocessors connected to the main processor, at least one of the coprocessors comprises an optical processor having optical algorithmic function circuitry;

the optical processor comprises a monolithic structure that includes:

a plurality of input registers each of which is configured to receive a digital input signal;

a plurality of digital to analog converters, each one is connected to a respective one of the input registers and each is configured to convert a digital input signal received by the respective input register into an analog electrical signal;

at least two optical transmitters, each one connected to a respective one of the digital to analog converters and to the algorithmic function circuitry, and each one is configured to convert an analog electrical signal from the respective digital to analog converter into an optical signal;

the algorithmic function circuitry is connected to the optical transmitters and is configured to perform an algorithmic function using an optical signal received from the optical transmitters and that outputs results in the form of optical signals;

at least two optical receivers connected to the algorithmic function circuitry to receive a respective one of the optical signal results, each optical receiver is configured to convert the optical signal of the result received from the algorithmic function circuitry into an analog electrical signal;

a plurality of analog to digital converters, each one connected to a respective one of the optical receivers and each is configured to convert the analog electrical signal received from the respective optical receiver into a digital output signal; and a plurality of output registers, each one connected to a respective one of the analog to digital converter and each is configured to receive the digital output signal.

6. The processing system of claim 5, further comprising memory connected to the main processor.

7. The processing system of claim 5, wherein the optical transmitters comprise laser diodes.

8. The processing system of claim 5, wherein the optical receivers comprise photodiodes.

9. The processing system of claim 5, wherein the algorithmic function circuitry is configured to perform a multiply function and/or an add function.

* * * * *